United States Patent Office 3,214,414
Patented Oct. 26, 1965

3,214,414
PROCESS FOR THE MANUFACTURE OF POLYAMIDE BODIES HAVING UNIFORM FINELY CRYSTALLINE STRUCTURE
Hans Waltersperger, Chur, Switzerland, assignor to Inventa A.G. fur Forschung und Patentverwertung, Zurich, Switzerland
No Drawing. Filed Sept. 21, 1962, Ser. No. 225,383
Claims priority, application Switzerland, Sept. 27, 1961, 11,244/61
8 Claims. (Cl. 260—78)

The invention relates to the manufacture of shaped bodies made of polyamides and having a finely crystalline structure of great homogeneity and uniformity, and, more particularly, to such a manufacture by addition of suitable substances in liquid form promoting such crystallinity.

A number of physical and mechanical properties of materials shaped from polyamides depend upon the crystalline structure of the plastic. Among these are abrasion resistance, inherent stability or resistance to deformation, resistance to hot water, absence or minimizing of internal stresses, weatherability and surface hardness. It is a well-established general rule that these properties improve with increasing homogeneity and finely crystalline structure. Homogeneity and finely crystalline structure, in turn, are influenced by the crystallinity, i.e., the polyamide is the more finely grained and homogeneous, the finer and more regularly its individual crystals.

Microscopic studies under polarized light have shown that a continuous spherulitic structure can be obtained by cooling the polyamide from its melt extremely slowly. A slow cooling procedure, however, is not feasible in the fabrication of polyamides, since the latter usually is carried out by injection molding, extrusion or mold casting. The latter method would require an unduly long dwell within the mold and/or a large quantity of molds, whereas the former two processes are used especially because of their speed. In either case, a delay would be inevitable, rendering the respective processes uneconomical.

Unless particular measures are provided, a rapid cooling of the molten polyamide leads to unsatisfactory results in all instances. The melt crystallizes inhomogeneously, so that the entire structure is interspersed with flow lines and with larger and smaller spherulites in an irregular manner. Due to undercooling, amorphous zones form at the surface of the shaped bodies.

A number of processes are known, according to which a rapid cooling allegedly can be accomplished without incurring the above-named drawbacks. For instance, it has been proposed to admix to the polyamide 0.1 to 10 percent alkylated phenols (German published application DAS 1,052,679), or to admix small quantities of finely powdered higher-melting polyamides which have only limited solubility or merely swell therein (German published application DAS 1,052,112).

According to another suggestion (German published application DAS 1,061,063), the structure of formed or shaped polyamides can advantageously be changed by addition to the polyamide melt of finely divided solids forming crystallization nuclei, and by ensuing cooling in the conventional manner. A similar process is described in a German Patent 19,811, wherein to the melt, at any stage of its production, substances are added whose finely crystalline structure remains intact. These are to be added, finely divided in the melt, in quantities of 0.05 to 0.5 percent.

The German published application DAS 1,015,596 teaches that the formation of the spherulitic structures can be promoted upon rapid cooling of a polyamide melt when the grainy polyamide is stored in an oxygen-containing atmosphere at temperatures about 80° C., but below its melting point. This leads to the formation of a fine oxyde skin on the surface of the polyamide, which, upon melting of the same, acts as a crystallization accelerator. Fundamentally, this procedure also constitutes an admixture of a foreign material to the polyamide albeit the foreign material forms from the polyamide itself. In the execution of this process, yellowing of the shaped material occurs.

In all the processes named above, the manufacture of uniform materials is rendered difficult inasmuch as the production of sufficiently fine-grained seeding additives is complicated and a homogeneous and uniform distribution of these substances in the polyamides is practically impossible and is attainable with the more difficulties, on account of adhesion phenomena and agglomeration, the smaller the individual seeding particles.

It now has been found that bodies shaped from polyamides having a homogeneous and finely crystalline structure, increased surface hardness and very slight internal stresses, can be manufactured by cooling of the polyamides set in shape, in the presence of finely divided solids forming crystallizing nuclei, when these seeding materials in the mass to be shaped are supplied, at any stage of the manufacture, to the melt in liquid or dissolved form. The incorporation of the substances, which later form crystallizing nuclei, in liquid form assures their fully uniform distribution in the polyamide or in its starting materals, respectively. An important further advantage resides in the fact that, by the forming of the seeding nuclei in situ within the mass to be shaped, these nuclei are obtained in extremely small size.

In principle, each substance inert to caprolactam and/or soluble in a solvent inert to caprolactam can be employed which forms a solid and finely crystalline product under polymerization conditions or has this property together with another substance. For instance, by heating in the presence of water in the caprolactam itself, aluminum oxide or aluminum hydroxyde can be prepared from aluminum sulfate and potassium aluminum sulfate; or silicon oxide from magnesium chloride, magnesium oxide and waterglass. From potassium bichromate, fluosilicic acid and diethyl sulfate, in the presence of barium chloride, the corresponding finely crystalline barium salts $BaCrO_4$, $BaSiF_6$ and $BaSO_4$ form.

The invention now will be further illustrated by the following examples. However, it should be understood that these are given merely by way of explanation, not of limitation, and that numerous changes may be made in the details without departing from the spirit and the scope of the invention as hereinafter claimed.

Investigation under the polarization microscope and measurements of the internal stresses of the products made according to the invention show that the shaped polyamide bodies are of significantly improved quality over those hitherto known, as is shown in the examples.

The opening angle ∢ α shown in the tables in the examples is obtained by cutting the test plate from the center to one corner and by planar depression. The shaping temperature is 80° C.

EXAMPLE 1

20 kg. caprolactam were mixed with 1.4 to 1.6 liters water, and the mixture heated slowly with agitation. As soon as a clear solution had formed, 60 g. acetic acid (10%) could be stirred in as stabilizer. Then, a solution of 65 g. $Al_2(SO_4)_3 \cdot 18H_2O$ in 200 ml. water was entered in the caprolactam solution. The mixture then was polymerized in a manner known per se by heating to approximately 250–260° C. in an autoclave under pressure. During the polymerization, the aluminum sulfate, with water, decomposed, forming an extremely finely crystallized $Al(OH)$ or $Al_2O_3$, respectively, corresponding to 0.05 percent by weight, calculated on the polycaprolactam. The polymer thus obtained was spun to a filament of 1.5 mm. thickness, which then was cut into shavings. These were injected in a mold of 100 x 100 x 1 mm., preheated to approximately 90° C. Test plates thus were obtained which had properties much improved over plates containing no aluminum oxide as crystallizing nucleus, as shown in Table 1.

Table 1

| Material | Distortion ($<\alpha$) | Spherulite size ($\mu$) |
|---|---|---|
| Pure: Poly-ε-caprolactam | 2°30'–3°00' | 100 |
| Poly-ε-caprolactam according to Example 1 | 1 –2° | 5–10 |

EXAMPLE 2

The procedure was the same as in Example 1, except that a solution of 130 g. $Al_2(SO_4)_3 \cdot 18H_2O$ in 200 ml. water was used, so that 0.1 percent $Al_2O_3$ or $Al(OH)_3$ were present. Table 2 shows the results as compared to a polycaprolactam containing no aluminum oxide.

Table 2

| Material | Distortion ($<\alpha$) | Spherulite size ($\mu$) |
|---|---|---|
| Pure: Poly-ε-caprolactam | 2°30'–3°00' | 100 |
| Poly-ε-caprolactam according to Example 2 | 1 –2° | 5–10 |

EXAMPLE 3

20 kg. caprolactam were mixed with 1.4–1.6 liters water, and the mixture heated slowly under agitation. As soon as a clear solution had formed, 60 g. acetic acid (10%) could be stirred in as stabilizer. Then, a solution of 46.4 g. $KAl(SO_4)_2 \cdot 12H_2O$ in 100 ml. water was added to the caprolactam solution, and the mixture polymerized as described in Example 1. During the polymerization, the potassium aluminum sulfate decomposed under formation of extremely finely crystalline $Al(OH)_3$ or $Al_2O_3$, respectively, corresponding to a quantity of 0.05 percent by weight, calculated on the polycaprolactam present. Test samples were then prepared in the manner described in Example 1. Table 3 shows the improved properties over a pure polycaprolactam.

Table 3

| Material | Distortion ($<\alpha$) | Spherulite size ($\mu$) |
|---|---|---|
| Pure: Poly-ε-caprolactam | 2½–3° | 100 |
| Poly-ε-caprolactam according to Example 3 | 1 –2° | 5–10 |

EXAMPLE 4

The procedure was the same as in the preceding example, except that 93 g. $KAl(SO_4)_2 \cdot 12H_2O$, dissolved in 200 ml. water, were used. The aluminum oxide or hydroxide, respectively, thus present, corresponded to 0.1 percent by weight. Table 4 shows the comparison with pure polycaprolactam.

Table 4

| Material | Distortion ($<\alpha$) | Spherulite size ($\mu$) |
|---|---|---|
| Pure: Poly-ε-caprolactam | 2½–3° | 000 |
| Poly-ε-caprolactam according to Example 4 | 1 –2° | 5–10 |

EXAMPLE 5

20 kg. caprolactam were heated slowly with 1.4–1.6 liters water under agitation. As soon as a clear solution had formed, 60 g. acetic acid (10%) could be added as stabilizer under continued agitation. Thereafter, 50.4 g. $MgCl_2 \cdot 6H_2O$, dissolved in water, were added to the caprolactam solution. The polymerization then was carried out as described in Example 1. During the polymerization, the magnesium chloride reacted with water, forming an extremely finely crystalline $Mg(OH)_2$ or MgO, respectively, corresponding to a quantity of 0.05 percent by weight, calculated on the polycaprolactam formed. Preparation of the test plates was accomplished as described in Example 1. A comparison of the properties of the material thus obtained with pure polycaprolactam is shown in Table 5.

Table 5

| Material | Distortion ($<\alpha$) | Spherulite size ($\mu$) |
|---|---|---|
| Pure: Poly-ε-caprolactam | 2½–3° | 100 |
| Poly-ε-caprolactam according to Example 5 | 1 –2° | 5–10 |

EXAMPLE 6

The procedure was the same as in the preceding example except that a solution of 100.8 g. $MgCl_2 \cdot 6H_2O$ was employed, so that after polymerization 0.1 percent by weight magnesium oxide or hydroxide, respectively, were present. Table 6 shows the comparison to pure polycaprolactam.

Table 6

| Material | Distortion ($<\alpha$) | Spherulite size ($\mu$) |
|---|---|---|
| Pure: Poly-ε-caprolactam | 2½–3° | 100 |
| Poly-ε-caprolactam according to Example 6 | 1 –2° | 5–10 |

EXAMPLE 7

20 kg. caprolactam were heated slowly under agitation with 1.4–1.6 liters water. As soon as a clear solution was obtained, 60 g. acetic acid (10%) could be stirred in as stabilizer. Then 50 g. waterglass (40%) in aqueous solution were added to the caprolactam solution. This mixture then was polymerized as described in Example 1. During the polymerization, the waterglass decomposed in the heat in the presence of water, forming an extremely finely crystalline $Si(OH_2)_4$ or $SiO_2$, respectively, corresponding to 0.05 percent by weight, calculated on the polycaprolactam formed.

The test plates were prepared as described in Example 1 and Table 7 shows their properties, compared to a polycaprolactam without the additive.

Table 7

| Material | Distortion ($<\alpha$) | Spherulite size ($\mu$) |
|---|---|---|
| Pure: Poly-ε-caprolactam | 2½–3° | 100 |
| Poly-ε-caprolactam according to Example 7 | 1 –2° | 5–10 |

EXAMPLE 8

The procedure was the same as followed in Example 7, except that 100 g. waterglass in aqueous solution were used, so that quantities corresponding to 0.1 percent by weight of silicic acid or $SiO_2$, respectively, were present. Table 8 shows the comparison of the product obtained to polycaprolactam without this additive.

*Table 8*

| Material | Distortion ($\sphericalangle a$) | Spherulite size ($\mu$) |
| --- | --- | --- |
| Pure: | | |
| Poly-ε-caprolactam | 2½–3° | 100 |
| Poly-ε-caprolactam according to Example 8 | 1–2° | 5–10 |

EXAMPLE 9

20 kg. caprolactam were heated slowly with agitation together with 1.4–1.6 liters water. As soon as a clear solution had formed, 60 g. acetic acid (10%) could be stirred in as stabilizer. To the caprolactam solution then were added 5.80 g. $K_2Cr_2O_7$ in 100 ml. water and 9.7 g. $BaCl_2 \cdot 2H_2O$ in 100 ml. water. The polymerization was carried out is in Example 1. During the polymerization, the potassium bichromate reacted with the barium chloride, forming extremely finely crystalline $BaCrO_4$, corresponding to 0.05 percent by weight, calculated on the polycaprolactam. The polymer was molded into test plates, as described in Example 1. Table 9 shows the properties of the end product, compared to pure caprolactam.

*Table 9*

| Material | Distortion ($\sphericalangle a$) | Spherulite size ($\mu$) |
| --- | --- | --- |
| Pure: | | |
| Poly-ε-caprolactam | 2½–3° | 100 |
| Poly-ε-caprolactam according to Example 9 | 1° | 1–3 |

EXAMPLE 10

The procedure was the same as in the preceding example, except that 11.6 g. $K_2Cr_2O_7$ and 19.6 g. $BaCl_2$ were used, each in 100 ml. water. The $BaCrO_4$ thus was present in quantities corresponding to 0.1 percent by weight. The test plates were prepared as in Example 1, and Table 10 shows the results compared to pure polycaprolactam.

*Table 10*

| Material | Distortion ($\sphericalangle a$) | Spherulite size ($\mu$) |
| --- | --- | --- |
| Pure: | | |
| Poly-ε-caprolactam | 2½–3° | 100 |
| Poly-ε-caprolactam according to Example 10 | 1° | 1–3 |

EXAMPLE 11

20 kg. caprolactam were heated slowly with 1.4 to 1.6 liters water under agitation. As soon as a clear solution was obtained, 60 g. acetic acid (10%) could be stirred in as stabilizer. The following was then added to the caprolactam solution:

19.3 g. $H_2SiF_6$ in 100 ml. water and 8.8 g. $BaCl_2 \cdot 2H_2O$ in 100 ml. water. The polymerization was carried out as in Example 1. During the polymerization, the barium chloride reacted with the fluosilicic acid to form an extremely finely crystalline $BaSiF_6$, corresponding to 0.05 percent by weight, calculated on the polycaprolactam. The test plates were prepared as described in Example 1, and the results of the comparison with pure polycaprolactam are shown in Table 11.

*Table 11*

| Material | Distortion ($\sphericalangle a$) | Spherulite size ($\mu$) |
| --- | --- | --- |
| Pure: | | |
| Poly-ε-caprolactam | 2½–3° | 100 |
| Poly-ε-caprolactam according to Example 11 | 1° | 1–3 |

EXAMPLE 12

The procedure followed that described in Example 11, except that 38.6 g. $H_2SiF_6$ and 17.6 g. $BaCl_2 \cdot 2H_2O$ were used, each in 100 ml. water, so that the $BaSiF_6$ formed was present in amounts corresponding to 0.1 percent by weight. Table 12 shows the test results comparative to pure polycaprolactam containing no such additive.

*Table 12*

| Material | Distortion ($\sphericalangle a$) | Spherulite size ($\mu$) |
| --- | --- | --- |
| Pure: | | |
| Poly-ε-caprolactam | 2½–3° | 100 |
| Poly-ε-caprolactam according to Example 12 | 1° | 1–3 |

EXAMPLE 13

19 kg. caprolactam were heated slowly under agitation with 1.4 to 1.6 liters water. As soon as a clear solution was obtained, 60 g. acetic acid (10%) could be stirred in as stabilizer. The following then were added to the caprolactam solution:

(1) 6.6 g. $(C_2H_5)_2SO_4$ in 1 kg. caprolactam solution (as above); and
(2) 10.5 g. $BaCl_2 \cdot 2H_2O$ in 100 ml. water.

This mixture then was polymerized in the manner described in Example 1. During the polymerization the diethyl sulfate reacted with $BaCl_2$ under formation of extremely finely crystalline $BaSO_4$, corresponding to quantities of 0.05 percent by weight, calculated on the polycaprolactam formed. The fabrication into test plates followed the procedure in Example 1, and Table 13 shows the comparison of the material with a polycaprolactam containing no $BaSO_4$.

*Table 13*

| Material | Distortion ($\sphericalangle a$) | Spherulite size ($\mu$) |
| --- | --- | --- |
| Pure: | | |
| Poly-ε-caprolactam | 2½–3° | 100 |
| Poly-ε-caprolactam according to Example 13 | ½–1° | 1–3 |

EXAMPLE 14

The procedure was the same as in the preceding example, except that 13.2 g. $(C_2H_5)_2SO_4$ in 1 kg. caprolactam solution and 21.0 g. $BaCl_2 \cdot 2H_2O$ in 100 ml. water were added to the caprolactam solution, so that an amount corresponding to 0.1 percent by weight $BaSO_4$ was present. Table 14 shows the results obtained compared to a pure polycaprolactam containing no barium sulfate.

*Table 14*

| Material | Distortion ($\sphericalangle a$) | Spherulite size ($\mu$) |
| --- | --- | --- |
| Pure: | | |
| Poly-ε-caprolactam | 2½–3° | 100 |
| Poly-ε-caprolactam according to Example 14 | ½–1° | 1–3 |

I claim as my invention:

1. A process for the manufacture of poly-E-caprolactam having a homogeneous, uniform, finely crystalline and continuous spherulitic structure with a minimum of internal stresses, which comprises adding to an aqueous solution of E-caprolactam, in amounts of 0.05 to 0.1 percent of poly-E-caprolactam formed, an aqueous solution of seeding nucleus formers selected from the group consisting of (a) aluminum sulfate;
(b) potassium aluminum sulfate;
(c) magnesium sulfate;
(d) fluosilicic acid plus barium chloride;
(e) diethyl sulfate plus barium chloride;
(f) potassium bichromate plus barium chloride;

and heating said aqueous solution of E-caprolactam and seeding nucleus formers at a temperature of 250 to 260° C. for a time sufficient to polymerize said caprolactam and to precipitate the seeding nucleus formed.

2. The process as defined in claim 1, wherein said seeding nucleus formers, during polymerization, form seeding nuclei, consisting of aluminum oxide from the formers named under (a) and (b), respectively;
magnesium oxide from the former named under (c);
barium hexafluoride from the formers named under (d);
barium sulfate from the former named under (e); and
barium chromate from the former named under (f).

3. The process as defined in claim 1, wherein said seeding nucleus former is aluminum sulfate.

4. The process as defined in claim 1, wherein said seeding nucleus former is potassium aluminum sulfate.

5. The process as defined in claim 1, wherein said seeding nucleus former is magnesium sulfate.

6. The process as defined in claim 1, wherein said seeding nucleus former is fluosilicic acid plus barium chloride.

7. The process as defined in claim 1, wherein said seeding nucleus former is diethyl sulfate plus barium chloride.

8. The process as defined in claim 1 wherein said seeding nucleus former is potassium bichromate plus barium chloride.

References Cited by the Examiner

UNITED STATES PATENTS

| | | | |
|---|---|---|---|
| 2,241,321 | 5/41 | Schlack | 260—78 |
| 2,278,878 | 4/42 | Hoff | 260—78 |
| 2,868,757 | 1/59 | Symons | 260—78 |
| 2,874,139 | 1/59 | Symons | 260—78 |
| 2,875,171 | 1/59 | Foster et al. | 260—78 |
| 3,080,345 | 3/63 | Brooks et al. | 250—78 |

WILLIAM H. SHORT, *Primary Examiner.*